US 6,993,007 B2

(12) United States Patent
Gummalla et al.

(10) Patent No.: US 6,993,007 B2
(45) Date of Patent: Jan. 31, 2006

(54) SYSTEM AND METHOD FOR SUPPRESSING SILENCE IN VOICE TRAFFIC OVER AN ASYNCHRONOUS COMMUNICATION MEDIUM

(75) Inventors: Ajay Chandra V. Gummalla, Atlanta, GA (US); Dolors Sala, Atlanta, GA (US)

(73) Assignee: Broadcom Corporation, Irvine, CA (US)

(*) Notice: Subject to any disclaimer, the term of this patent is extended or adjusted under 35 U.S.C. 154(b) by 848 days.

(21) Appl. No.: 09/783,405

(22) Filed: Feb. 15, 2001

(65) Prior Publication Data
US 2002/0021711 A1 Feb. 21, 2002

Related U.S. Application Data

(63) Continuation-in-part of application No. 09/427,792, filed on Oct. 27, 1999, now Pat. No. 6,804,251.

(60) Provisional application No. 60/182,470, filed on Feb. 15, 2000, provisional application No. 60/247,188, filed on Nov. 9, 2000, provisional application No. 60/254,415, filed on Dec. 8, 2000, provisional application No. 60/262,201, filed on Jan. 17, 2001, provisional application No. 60/262,203, filed on Jan. 17, 2001.

(51) Int. Cl.
*H04J 3/16* (2006.01)

(52) U.S. Cl. ................................ 370/346; 370/468

(58) Field of Classification Search ........ 370/352–356, 370/401, 493, 477, 521, 449–456, 433–437
See application file for complete search history.

(56) References Cited

U.S. PATENT DOCUMENTS

| 4,534,024 A | 8/1985 | Maxemchuk et al. |
| 4,712,210 A | 12/1987 | Davis et al. |
| 5,341,374 A | 8/1994 | Lewen et al. |
| 5,421,030 A | 5/1995 | Baran |
| 5,425,027 A | 6/1995 | Baran |
| 5,469,495 A | 11/1995 | Beveridge |
| 5,515,379 A | 5/1996 | Crisler et al. |

(Continued)

FOREIGN PATENT DOCUMENTS

EP   0 774 848 A2   5/1997

(Continued)

OTHER PUBLICATIONS

"Radio Frequency Interface Specification SP-RFIv1.1-I02-990731," Data-Over-Cable Service Interface Specifications, Jul. 31, 1999, retrieved from the Internet on Oct. 23, 2001: <URL:http://www.tconl.com/{jkleens/DOCSIS.pdf>, pp. i-iv, 132-139 and 291-296.

(Continued)

*Primary Examiner*—John Pezzlo
*Assistant Examiner*—Hong Sol Cho
(74) *Attorney, Agent, or Firm*—Sterne, Kessler, Goldstein & Fox P.L.L.C.

(57) ABSTRACT

A method and system for increasing the efficiency of providing bandwidth for voice traffic to a data provider via asynchronous communication mediums is provided. This is generally accomplished by not transmitting any data during the silence periods and playing out background noise (i.e., comfort noise) at the other end, to obtain significant bandwidth savings.

24 Claims, 7 Drawing Sheets

U.S. PATENT DOCUMENTS

| | | | |
|---|---|---|---|
| 5,539,449 | A | 7/1996 | Blahut et al. |
| 5,570,355 | A | 10/1996 | Dail et al. |
| 5,606,561 | A | 2/1997 | Scheibel, Jr. et al. |
| 5,631,908 | A | 5/1997 | Saxe |
| 5,742,592 | A | 4/1998 | Scholefield et al. |
| 5,756,280 | A | 5/1998 | Soora et al. |
| 5,850,400 | A | 12/1998 | Eames et al. |
| 5,897,613 | A * | 4/1999 | Chan .......................... 704/210 |
| 5,926,478 | A | 7/1999 | Ghaibeh et al. |
| 5,963,557 | A | 10/1999 | Eng |
| 5,982,780 | A | 11/1999 | Bohm et al. |
| 6,055,268 | A | 4/2000 | Timm et al. |
| 6,065,049 | A * | 5/2000 | Beser et al. ................ 709/218 |
| 6,185,224 | B1 | 2/2001 | Limb et al. |
| 6,259,695 | B1 | 7/2001 | Ofek |
| 6,438,123 | B1 * | 8/2002 | Chapman .................... 370/351 |
| 6,442,158 | B1 * | 8/2002 | Beser .......................... 370/352 |
| 6,580,730 | B1 | 6/2003 | Loukianov |
| 6,594,280 | B1 * | 7/2003 | Chapman .................... 370/469 |
| 6,621,812 | B1 * | 9/2003 | Chapman et al. ........... 370/346 |
| 6,804,251 | B1 | 10/2004 | Limb et al. |
| 6,807,193 | B1 * | 10/2004 | Beser .......................... 370/498 |
| 6,847,635 | B1 * | 1/2005 | Beser .......................... 370/352 |
| 2002/0061012 | A1 * | 5/2002 | Thi et al. .................... 370/352 |

FOREIGN PATENT DOCUMENTS

| | | |
|---|---|---|
| EP | 0 829 986 A1 | 3/1998 |
| EP | 0 844 803 A2 | 5/1998 |
| EP | 0 912 016 A2 | 4/1999 |
| WO | WO 99/18718 | 4/1999 |
| WO | WO 99/30449 | 6/1999 |

OTHER PUBLICATIONS

Copy of International Search Report issued Nov. 8, 2001, for Appln. No. PCT/US01/04841, 5 pages.

Limb, J. and Sala, D., "An Access Protocol to Support Multimedia Traffic over Hybrid Fiber/Coax Systems," *Proceedings of the International Workshop on Community Networking Integrated Multimedia Services to the Home,* Jun. 20, 1995, pp. 35-40.

Copy of International Search Report for Appln. No. PCT/US01/04820, issued Sep. 27, 2001, 8 pages.

Copy of International Search Report for Appln. No. PCT/US01/04904, issued Nov. 8, 2001, 4 pages.

Sala, D. et al., "Adaptive Control Mechanism for Cable Modem MAC Protocols," *Proceedings of the IEEE INFOCOM,* IEEE, vol. 3, Mar. 29, 1998, pp. 1392-1399.

Copy of International Search Report for Appln. No. PCT/US01/04819, issued Sep. 28, 2001, 7 pages.

John O. Limb and Dolors Sala, A Protocol for Efficient Transfer of Data over Hybrid Fiber/Coax Systems, article in IEEE/ACM Transactions on Networking, vol. 5, No. 6, pp. 872-881, Dec. 1997.

* cited by examiner

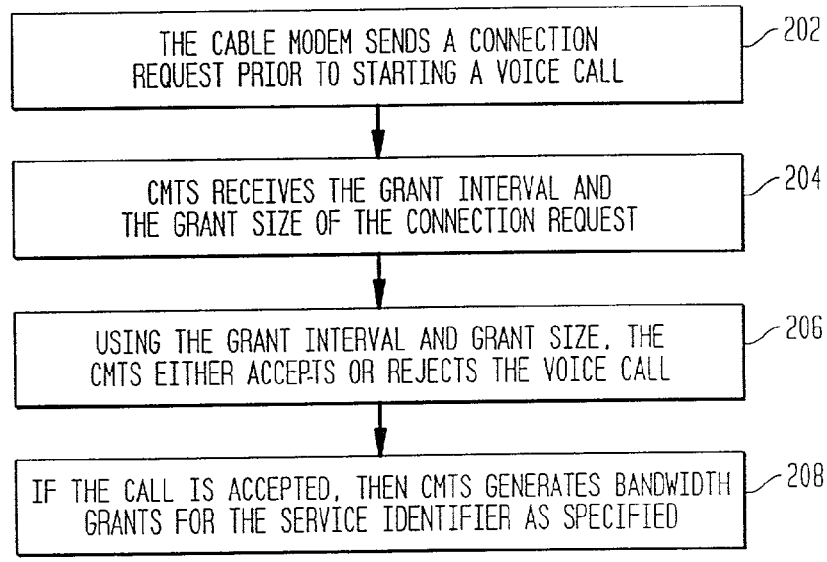
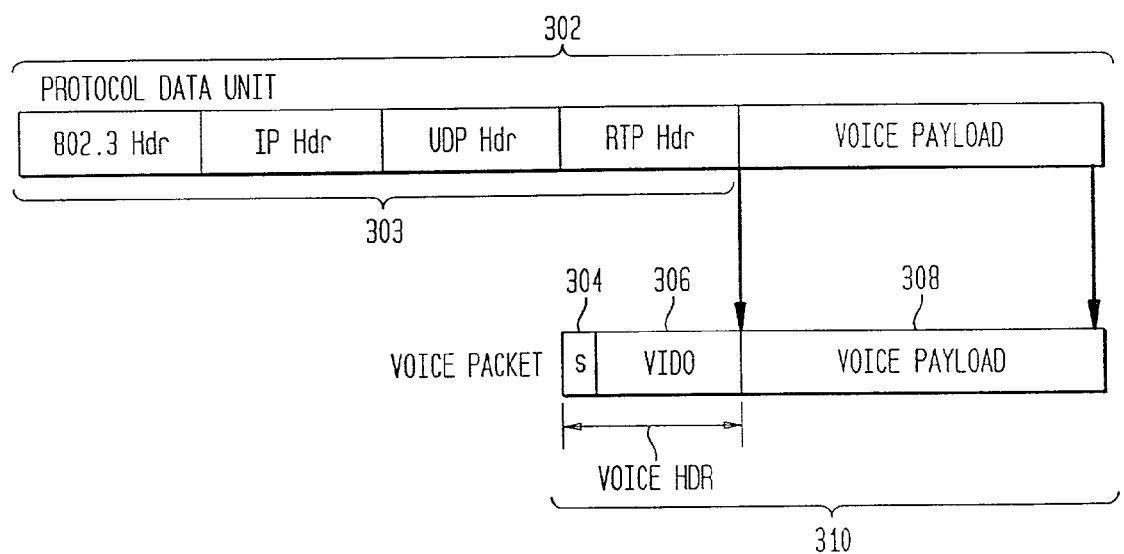

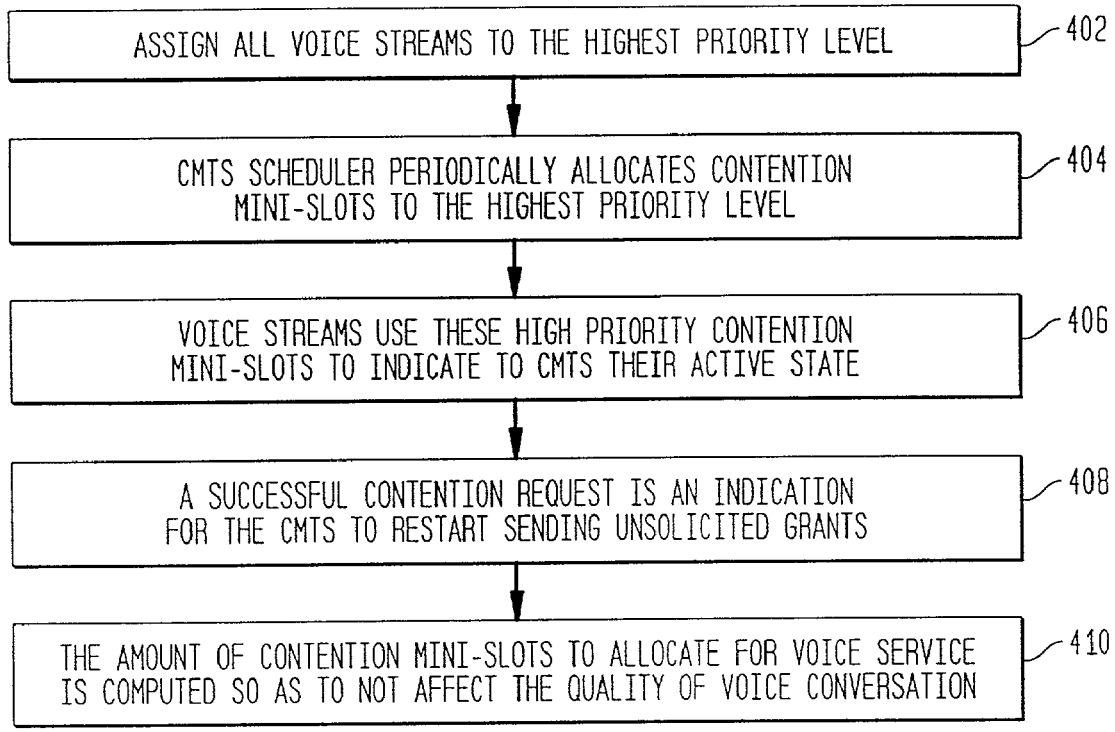
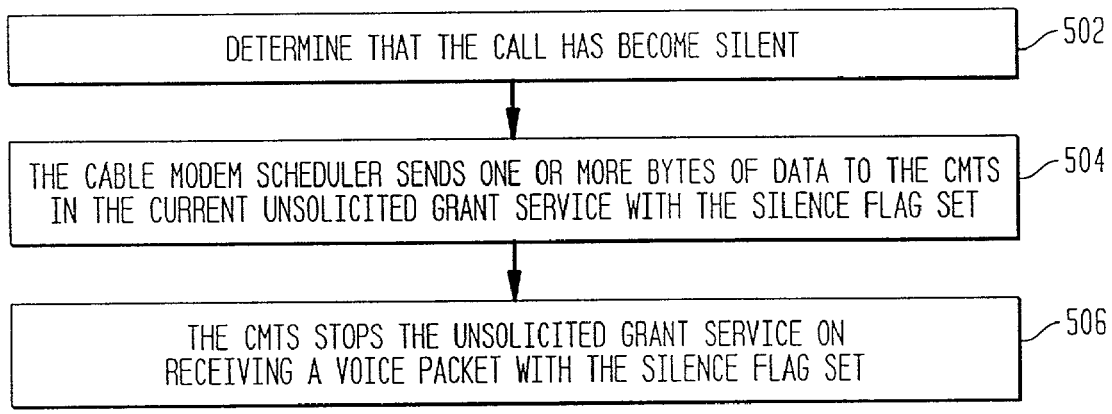

$$T = \frac{-1}{\lambda} \ln(1 - \sqrt{\frac{P_c}{N-1}})$$

SYSTEM AND METHOD FOR SUPPRESSING SILENCE IN VOICE TRAFFIC OVER AN ASYNCHRONOUS COMMUNICATION MEDIUM

CROSS-REFERENCE TO RELATED APPLICATIONS

This application claims the benefit to the following provisional applications:

U.S. patent Ser. No. 60/182,470, entitled "Intelligent Silence Suppression," filed Feb. 15, 2000, by Gummalla et al., (incorporated by reference in its entirety herein).

U.S. patent Ser. No. 60/247,188, entitled "A Local Scheduling Mechanism for Cable Modems," filed Nov. 9, 2000, by Sala et al., (incorporated by reference in its entirety herein).

U.S. patent Ser. No. 60/254,415, entitled "A Local Scheduling Mechanism for Cable Modems," filed Dec. 8, 2000, by Sala et al., (incorporated by reference in its entirety herein).

U.S. patent Ser. No. 60/262,201, entitled "Voice Scheduling Algorithms," filed Jan. 17, 2001, by Sala et al., (incorporated by reference in its entirety herein).

U.S. patent Ser. No. 60/262,203, entitled "Concatenation of Requests at CMTS," filed Jan. 17, 2001, by Sala et al., (incorporated by reference in its entirety herein).

This application is a continuation-in-part of the following non-provisional application:

U.S. patent Ser. No. 09/427,792, entitled "System and Method for Multiplexing Data from Multiple Sources," filed Oct. 27, 1999, by Limb et al., now U.S. Pat. No. 6,804,251, issued Oct. 12, 2004 (incorporated by reference in its entirety herein).

This application is related to the following non-provisional applications, all having the same filing date as the present application:

"Method, System and Computer Program Product for Scheduling Upstream Communications", U.S. patent Ser. No. 09/783,404, filed Feb. 15, 2001, by Gummalla et al. (incorporated by reference in its entirety herein).

"Voice Architecture For Transmission Over A Shared, Contention Based Medium," U.S. patent Ser. No. 09/785,020, filed Feb. 15, 2001, by Gummalla et al. (incorporated by reference in its entirety herein).

"System and Method for Combining Requests for Data Bandwidth by a Data Provider for Transmission of Data Over an Asynchronous Communication Medium," U.S. patent Ser. No. 09/783,311, filed Feb. 15, 2001, by Gummalla et al., (incorporated by reference in its entirety herein).

"Cable Modem System and Method for Specialized Data Transfer," U.S. patent Ser. No. 09/783,403, filed Feb. 15, 2001, by Bunn et al., (incorporated by reference in its entirety herein).

BACKGROUND OF THE INVENTION

1. Field of the Invention

The present invention is generally related to increasing the efficiency of providing bandwidth for voice traffic to a data provider via asynchronous communication mediums.

2. Related Art

The importance to the modern economy of rapid data access and exchange cannot be overstated. This explains the exponentially increasing popularity of the data access and exchange via cable networks (including coaxial cable or Hybrid fiber coaxial cable), the Internet, intranets, wireless networks, satellites and so forth (i.e., communication mediums). Rapid data access and exchange is partly dependent upon how efficiently bandwidth is allocated to a data provider in order for the data provider to transfer the requested data to a user via one of the communication mediums mentioned above.

One very desirable solution for rapid data access and exchange is via cable networks and cable modems. Cable modems provide asynchronous communications on cable networks. In general, a user connects a cable modem to the TV outlet for his or her cable TV, and the cable TV operator connects a cable modem termination system ("CMTS") in the operator's headend. The CMTS is a central device for connecting the cable network to a data network like the Internet. The CMTS is a central distribution point for a cable system. Data flows "downstream" from the CMTS to the cable modem (i.e., downstream communication). Alternatively, data flows "upstream" from the cable modem to the CMTS (i.e., upstream communication).

A common cable modem standard today is the Data Over Cable Service Interface Specification ("DOCSIS"). DOCSIS defines technical specifications for both cable modems and CMTS. DOCSIS downstream communication is quite restrictive in the way the control information is conveyed to the data provider (e.g., cable modem) via a DOCSIS CMTS scheduler. What is needed is to override the CMTS scheduler of DOCSIS and provide a CMTS scheduler that increases the efficiency of providing bandwidth for voice traffic to a data provider via asynchronous communication mediums.

SUMMARY OF THE INVENTION

The present invention is generally related to increasing the efficiency of providing bandwidth for voice traffic to a data provider via asynchronous communication mediums. The present invention, by not transmitting any data during the silence periods and playing out background noise (i.e., comfort noise) at the other end, obtains significant bandwidth savings.

The present invention includes a method for suppressing silence in bi-directional communications between a centralized node and a plurality of local nodes in an asynchronous network environment, comprising the steps of detecting a silent period in an upstream channel, the upstream channel transmitting data from a local node; and deactivating unsolicited grant service in response to the detecting a silent period.

BRIEF DESCRIPTION OF THE FIGURES

The present invention will be described with reference to the accompanying drawings, wherein:

FIG. 2 illustrates a high level flowchart of unsolicited grant service for voice traffic according to an embodiment of the present invention.

FIG. 3 illustrates the format of an individual voice packet according to an embodiment of the present invention.

FIG. 4 is a flowchart illustrating the steps involved in reactivation mechanism of using priorities in contention mini-slots according to an embodiment of the present invention.

FIG. 5 illustrates the deactivation of unsolicited grant service (i.e., deactivating a call when the call goes silent) according to an embodiment of the present invention.

DETAILED DESCRIPTION OF THE INVENTION

A. Overview of the Invention

The present invention, by not transmitting any data during the silence periods and playing out background noise (i.e., comfort noise) at the other end, obtains significant bandwidth savings. For illustration purposes, the present invention is described in terms of being utilized with a cable network. It should be understood that the present invention is not limited to use with a cable network. In fact, the present invention may be used with any communication medium, including but not limited to, the Internet, intranets, fiber optic networks, wireless networks and satellites.

The present invention is described with reference to voice traffic or voice data. But, data in the present invention includes any type of information that is deterministic (i.e., a constant bit rate), such as voice traffic. Also, it is important to note that the present invention is not limited to voice traffic. In fact, the present invention can be used for any constant bit rate source with ON and OFF periods.

B. System Architecture Overview

Figure 1:
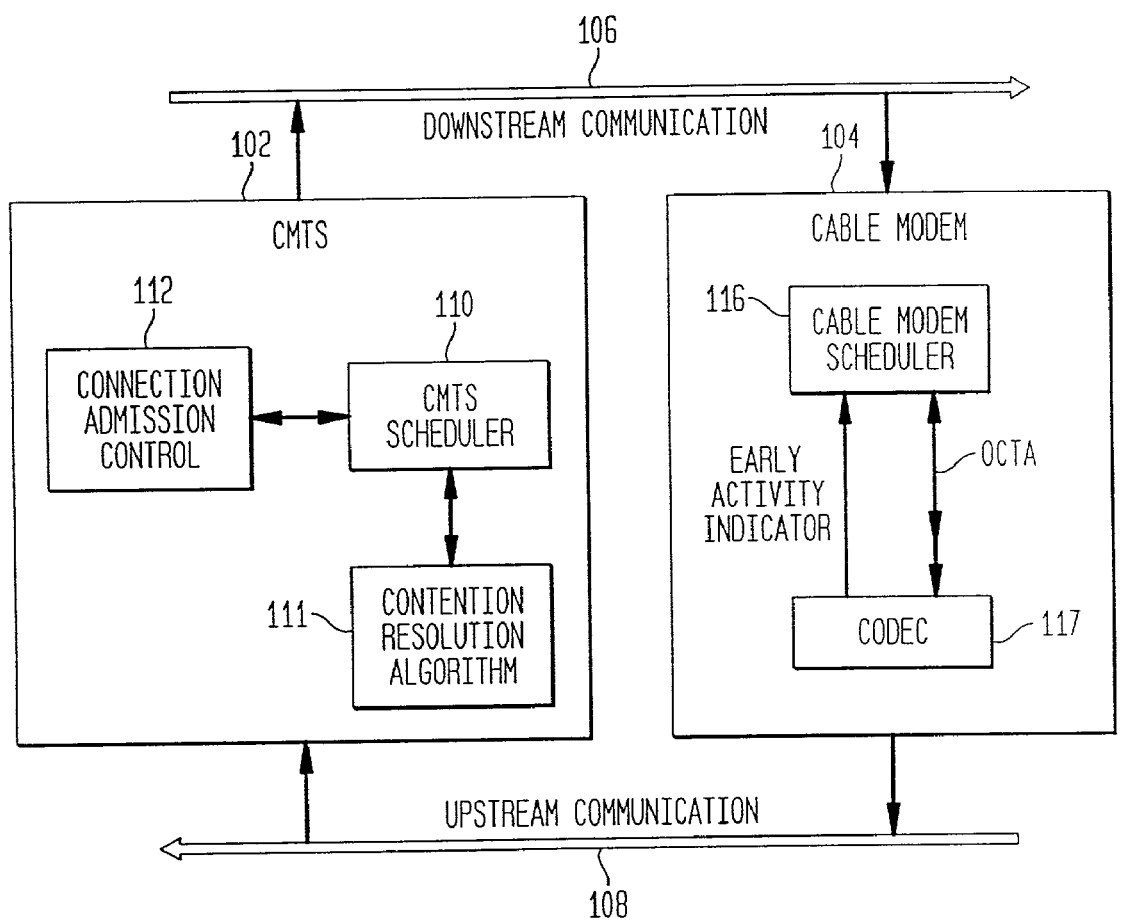
FIG. 1 is a block diagram representing an example operating environment of the present invention according to an embodiment of the present invention.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, a CMTS 102, a cable modem 104, downstream communication 106 and upstream communication 108, are shown. CMTS 102 further includes a CMTS scheduler 102, a contention resolution algorithm 111 and connection admission control 112. Cable modem 104 includes a cable modem scheduler 116 and a codec 117 (or activity detector). Each of these components will be briefly described next.

In general, cable modem 104 forwards or provides data via asynchronous communications on cable networks. Cable modem 104 receives data from a user that needs to be transferred via a cable network. For many types of data, in order for cable modem 104 to transfer the data via a cable network it must request that CMTS 102 grant to it the necessary bandwidth. The scenario where cable modem 104 needs to request the necessary bandwidth is described in detail in related non-provisional application Ser. No. 09/783,404, entitled "Method, System and Computer Program Product for Scheduling Upstream Communications", filed concurrently with the present invention (incorporated herein by reference in its entirety).

Alternatively, when voice traffic is involved, CMTS 102 automatically grants bandwidth to cable modem 104. One reason for this automatic grant of bandwidth is that voice traffic (or traffic data) cannot tolerate delays in its transfer. Therefore, since constant voice traffic is so deterministic (i.e., constant bit rate), the CMTS can generate bandwidth grants at a certain periodicity without the need of bandwidth requests from the data provider (e.g., cable modem). This service is referred to as unsolicited grant service in DOCSIS and is described below with reference to FIG. 2.

Packetized voice generates a fixed size packet at deterministic instants. This means that cable modem 104 requires an upstream transmission opportunity at regular intervals of time. The periodicity depends on packetization of voice. One example that is not meant to limit the present invention is when G.711 PCM voice generates a byte of data every 125 microsecs or 64 Kbps. If these bytes are accumulated into 10 ms packets, the packet size would be 80 bytes of data. Therefore, every 10 ms cable modem 104 will need enough upstream bandwidth to transmit 80 bytes of data.

The voice calls may be supported in a connection-based mode. The present invention will focus on voice traffic and ways of increasing the efficiency of providing bandwidth for voice traffic to a data provider via asynchronous communication mediums by suppressing silence. Ways of increasing the efficiency of providing bandwidth for voice traffic to a data provider via asynchronous communication mediums by suppressing silence is described below in detail. First, a high level flowchart of unsolicited grant service will be described next with reference to FIG. 2.

In FIG. 2, control starts at step 202. In step 202, cable modem 104 send a connection request to CMTS 102 prior to starting a voice call. A connection connect consists of a grant interval and a grant size. The grant interval is the time period between successive grants. The grant size specifies how big each grant needs to be. Control then passes to step 204.

In step 204, CMTS 102 receives the grant interval and the grant size of the connection request. Control then passes to step 206.

In step 206, using the grant interval and the grant size of the connection request, CMTS 102 (via connection admission control 112) either accepts or rejects the voice call. Control then passes to step 208.

In step 208, if the call is accepted, then CMTS 102 generates bandwidth grants for the service identifier as specified. The flowchart in FIG. 2 ends at this point. Cable modem scheduler 116 is coupled to cable modem 104 and codec 117. Cable modem scheduler 116 is described in detail in related non-provisional application Ser. No. 09/783,404, entitled "Method, System and Computer Program Product for Scheduling Upstream Communications", filed concurrently with the present invention (incorporated herein by reference in its entirety). In general, cable modem scheduler 116 is responsible for multiplexing the internal traffic. Codec 117 can detect silence periods in upstream communication 108. Note that there is a bi-direction flow between codec 117 and cable modem scheduler 116 for the flow of data. There is a directional flow between codec 117 and cable modem scheduler 116 for the flow of an early activity indicator. In an embodiment of the present invention, cable modem 104 signals for a reduction in its bandwidth requirements at the beginning of silence periods and an increase when the silence periods end. This will be described in more detail in Section E below.

As stated above, DOCSIS is a common cable modem standard used today. DOCSIS provides standard centralized scheduling decisions that do not allow for flexibility in terms of deciding when or how cable modem 104 requests bandwidth from CMTS 102 in order to transfer its current data. Cable modem scheduler 116 defines an architecture that overrules this DOCSIS standard in a seamless manner. Some of the main differences between the DOCSIS standard and cable modem scheduler 116 are described next.

One main difference between the DOCSIS standard and cable modem scheduler 116 includes the decoupling of the request phase (for data other than voice) with the grant phase (i.e., grants of bandwidth received from CMTS 102). For voice data, bandwidth grants are done automatically by CMTS 102 without cable modem 104 having to make any requests. Once bandwidth grants are received by cable modem 104, cable modem scheduler 116 uses granted bandwidth as they are received regardless of their size and priority specification, thereby ignoring the DOCSIS standard. Cable modem scheduler 116 ignores the priority id of the granted bandwidth. In addition, piggyback requests may be separate requests for bandwidth instead of extended header as done in the DOCSIS standard. How piggyback requests are handled by the present invention are described in detail in related non-provisional application Ser. No. 09/783,404, entitled "Method, System and Computer Program Product for Scheduling Upstream Communications". Here, it is important to note that piggybacks requests are treated as separate requests for bandwidth and may be given a priority identifier. In another embodiment, piggybacks requests are not assigned a priority identifier. CMTS 102, CMTS scheduler 110, connection admission control 112 and contention resolution algorithm 111 will now be described.

CMTS 102 is a central device for connecting the cable network to a data network. CMTS scheduler 102 is a bandwidth manager. CMTS scheduler 102, as a bandwidth manager that decides how to grant available bandwidth according to the current bandwidth requests. This grant for voice traffic is done via downstream communication 106 in such as way as to reduce overhead by suppressing silence. This ability to decide how to grant available bandwidth provides flexibility. This flexibility allows the present invention to reduce the overhead involved in granting bandwidth to cable modem 104 via downstream communication.

Contention resolution algorithm 111 decides how to use contention mini-slots. Contention mini-slots are described in detail in related non-provisional application Ser. No. 09/783, 404, entitled "Method, System and Computer Program Product for Scheduling Upstream Communications". Connection admission control 112 decides whether or not to admit more traffic in the system. This is typically only used for voice traffic (e.g., step 206 in FIG. 2 above).

As described above, the way in which the DOCSIS CMTS scheduler grants bandwidth is quite restrictive, thus creating unnecessary overhead in downstream communication. The details of how CMTS scheduler 110 grants bandwidth to cable modem 104 for voice traffic so that to decrease overhead by suppressing silence will be described in detail below. Next, the format of an individual voice packet is described with reference to FIG. 3.

C. Voice Header Format

FIG. 3 illustrates an example format of an individual voice packet used by the present invention according to an embodiment. An individual voice packet 310 includes a silence flag 304 (i.e., silence bit), a voice channel identifier 306 (VIDO) and a voice payload 308. Silence flag 304 and voice channel identifier 306 are attached to voice payload 308 to help in demultiplexing a byte. When silence flag 304 is set it indicates that the silence period starts. Voice packet 310 with the silence set carries the silence flag parameters.

Also shown in FIG. 3 is a protocol data unit 302. Headers 303 of protocol data unit 302 are compressed to include silence flag 304 and voice channel identifier 306 (VIDO) (i.e., the header of voice packet 310.

In general, voice channel transmits the raw data without any headers. Requests can be piggybacked with voice transmissions, and they typically are included at the beginning of the raw voice data. Since CMTS 102 grants the voice packet region, CMTS 102 knows the length of the voice packets that are to be transmitted in this region. If the total message length is different it typically is due to the voice channels becoming silent. The voice packets can be of different sizes if the voice channels operate at different compression rates and packetization intervals. However, the packet sizes are typically within a set of fixed numbers. Thus, CMTS 102 can demultiplex the piggybacking requests included with the voice packet(s) without the need of additional packet delimiters. The individual voice packets are typically demultiplexed at a higher protocol level. Next, the support of voice with activity detection (AD) is described.

D. Support of Voice with Activity Detection (AD)

In general, in any conversation only one of the persons is speaking at a given instant. Therefore, during a conversation only one half of the circuit is needed at any given time. Typically, one side of the conversation is active for only 40% of the time. The present invention, by not transmitting any data during the silence periods and playing out background noise (i.e., comfort noise) through the user of noise parameters at the other end, obtains significant bandwidth savings. This technique of the present invention may be referred to as silence suppression, or voice activity detection (VAD).

The effectively support this type of traffic depends, at least partly, on the need of transmission of noise parameters during the silence periods. The present invention incorporates at least two ways of transmitting noise parameters during silence periods. The first way involves assuming that the noise is completely regenerated at CMTS 102 and hence cable modem 104 goes completely idle during the silence period (i.e., silence is eliminated). The second way involves transmitting the noise parameters in a small packet. In this case, an activity detection mechanism translates to a two state call with a fixed bandwidth requirement during the active state, and a fixed, but smaller, bandwidth requirement during the silence period. The present invention refers to this as silence compression since the silence is compressed instead of being eliminated.

In summary, traffic generated by a voice codec 117 can be of three types in the present invention. These three types include: 1) constant voice generates constant rate for the duration of the call; 2) voice with silence compression alternates two constant rates, high rate during talking periods and low rate during silent periods, and 3) voice with silence suppression turns on a constant rate during talk periods and turns it off during silent periods. A form of the latter type, called contention-based silence suppression, will now be described.

E. Contention-Based Silence Suppression Overview

In general, a voice activity detection mechanism utilizes the fact that one side of the conversation is active only 40% of the time. Codec 117 can detect these silence periods in the upstream side of the conversation (or via upstream communication 108). Cable modem 104 signals for a reduction in its bandwidth requirements at the beginning of silence periods and an increase when they end. Cable modem 104 indicates silence to CMTS 102 via the bandwidth grant after a talk spurt. Call reactivation will be described next.

Silence suppression is supported by the present invention via call reactivation by using priorities in contention mini-slots. Alternatively, call reactivation is supported in DOCSIS using request polls. In DOCSIS, during silence periods, the unsolicited grants are stopped and request polls are sent instead. These polls are defined to send the reactivation request when the call goes active again. However, a voice call is silent in the order of a few seconds. It is obvious that any kind of polling results in a large amount of overhead. A way to reduce this overhead is accomplished by the present invention via its call reactivation mechanism by using priorities in contention mini-slots. Here, overhead is reduced by 1) eliminating the polls, 2) letting them share across all voice calls, and 3) less contention mini-slots are needed to transmit successfully a request as compared to the continuous polls. FIG. 4 is a flowchart illustrating the steps involved in reactivation mechanism of using priorities in contention mini-slots according to an embodiment of the present invention.

In FIG. 4, control starts at step 402. In step 402, cable modem scheduler 116 assigns the highest priority level to all voice streams. Control then passes to step 404.

In step 404, CMTS scheduler 110 periodically allocates contention mini-slots to the highest priority level. Control then passes to step 406.

In step 406, a successful contention request is an indication for CMTS scheduler 110 to restart sending unsolicited bandwidth grants. Control then passes to step 408.

In step 408, CMTS scheduler 110 updates the amount of contention mini-slots to allocate for voice service so that the reactivation time does not affect the quality of the voice conversation. This step is further described below in Section G. The flowchart in FIG. 4 ends at this point. Next, the activation and deactivation of unsolicited grant service is described in the following section.

F. Activation/Deactivation of Unsolicited Grant Service in Contention-Based Silence Suppression The deactivation of unsolicited grant service (i.e., deactivating a call when the call goes silent) will be described first with reference to FIG. 5. Then the activation of unsolicited grant service (i.e., activating a call when the call becomes active) will be described with reference to FIG. 6.

FIG. 5 starts at step 502. In step 502, codec 117 determines that the call has become silent in upstream communication 108. Control then passes to step 504.

In step 504, cable modem scheduler 116 sends a single byte of data to CMTS 102 in the current unsolicited grant service with the silence flag set (i.e. set silence flag 304 in voice packet 310 from FIG. 3). The set silence flag is sent whenever it happens. Note, that the single byte of data to CMTS 102 can also be done in the last packet. Control then passes to step 506.

In step 506, CMTS scheduler 110 stops the unsolicited grant service on receiving protocol data unit 302 with silence flag 304 set. The flowchart in FIG. 5 ends at this point.

The activation of unsolicited grant service (i.e., activating a call when the call becomes active) will now be discussed. In general, an additional bandwidth request from cable modem scheduler 116 is considered as a request to reactivate the call. This reactivation message can be sent either in a contention mini-slot or piggybacked in a granted region, as described next in FIG. 6. Note that codec 117 can be used by the present invention to provide an early indication to reactivate the grant service faster.

Figures 6, 7:
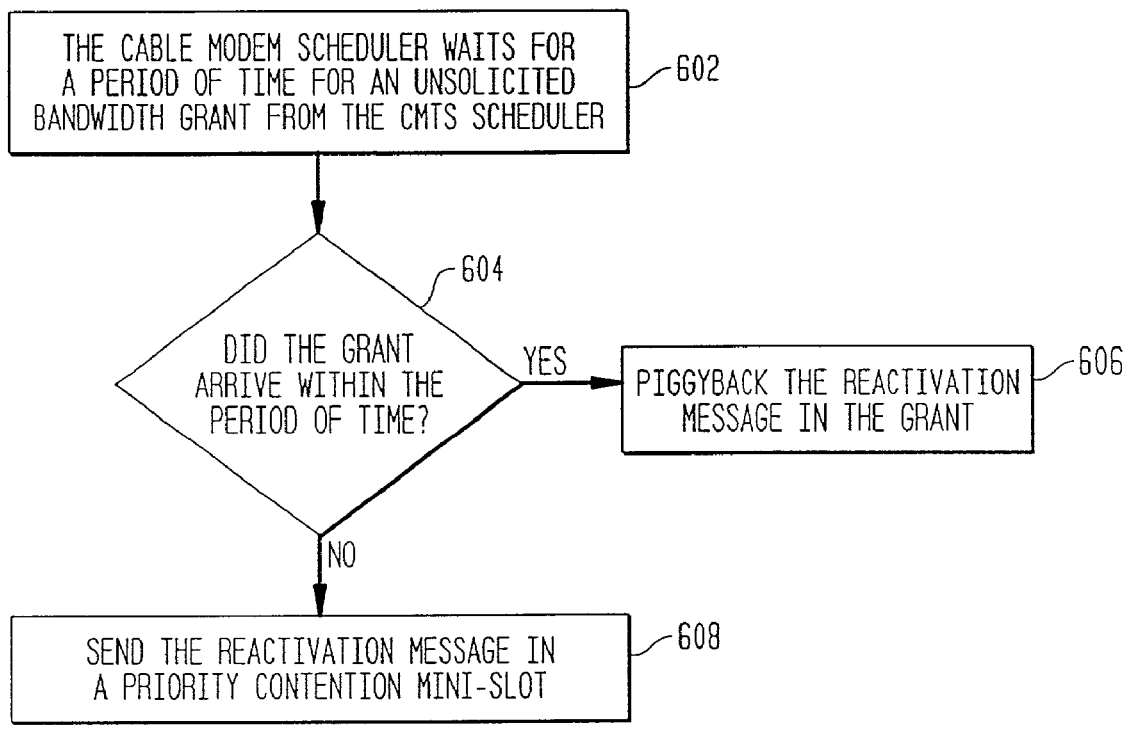
FIG. 6 illustrates the activation of unsolicited grant service (i.e., activating a call when the call becomes active) according to an embodiment of the present invention.
FIG. 7 is a formula showing how to compute the periodicity in seconds of contention mini-slots according to an embodiment of the present invention.

FIG. 6 starts at step 602. In step 602, cable modem scheduler 116 waits for a period of time for CMTS 102 to schedule an unsolicited bandwidth grant via downstream communication 106. Control then passes to step 604.

In step 604, if the grant arrived within the period of time, then control passes to step 606. Alternatively, control passes to step 608.

In step 606, cable modem scheduler 116 piggybacks the reactivation request in the grant to be sent to CMTS 102 via upstream communication. The flowchart in FIG. 6 ends at this point.

In step 608, cable modem scheduler 116 sends the reactivation message in a priority contention mini-slot. The flowchart in FIG. 6 ends at this point.

There are three alternative reactivate request methods that the present invention may utilize. The first is referred to as an ASAP policy. Here, cable modem scheduler 116 sends the reactivate request in the first available opportunity (either in the first voice contention mini-slot or in the first grant). The second alternative reactivate request method is referred to as a maximize piggyback method. Here, cable modem scheduler 116 waits for a grant if there is another call that is active. The third alternative reactivate request method deals with waiting for a grant to send the reactivation message if a grant that is will meet latency constraints is guaranteed to arrive. Otherwise, send the reactivate request in the first voice contention mini-slot. In any case, if a grant comes before knowing the result of the contention request, cable modem scheduler 116 will send the reactivation again. The duplicated activation will be discarded by CMTS 102.

The present invention also can deal with inactive calls in an efficient manner. Here, the present invention implements an inactivity timer. If the number of unused unsolicited grants is above a threshold, then stop the unsolicited grants and start give it a poll. The determination of the number of voice contention mini-slots to be generated in contention-based silence suppression (step 410 in FIG. 4) will be described next in Section G.

G. The Determination of the Number of Voice Contention Mini-Slots to be Generated in Contention-Based Silence Suppression In general, the number of voice contention mini-slots to be generated depends on the number of active voice streams according to an embodiment of the present invention. Typically, the most conservative case is to consider the worst case which corresponds to having the maximum number of voice streams that the particular system can support.

An algorithm or method used by the present invention to determine the number of contention mini-slots needed for voice priority requires the following defined notation:

T=periodicity of contention mini-slots in seconds;
$\lambda$=mean silence duration in seconds;
N=number of calls in silent state; and
Pc=probability of collision having N number of calls in silent state.

The periodicity in seconds of contention mini-slots can be computed by using the formula shown in FIG. 7. An example utilizing the formula in FIG. 7 will be described. This example is for illustration purposes only and does not limit the present invention. If the mean silence duration ($\lambda$)

is 2.35 s and there are 50 calls silent (N) at a given instant and it is desired to restrict the probability of collision (Pc) to $10^{-3}$, then the spacing needs to be chosen between priority contention slots is 1.5 ms (=$-2.35*\log(1-10^{-1.5}/49)$). But, one collision in a thousand attempts is overprovising of bandwidth.

Figure 8:
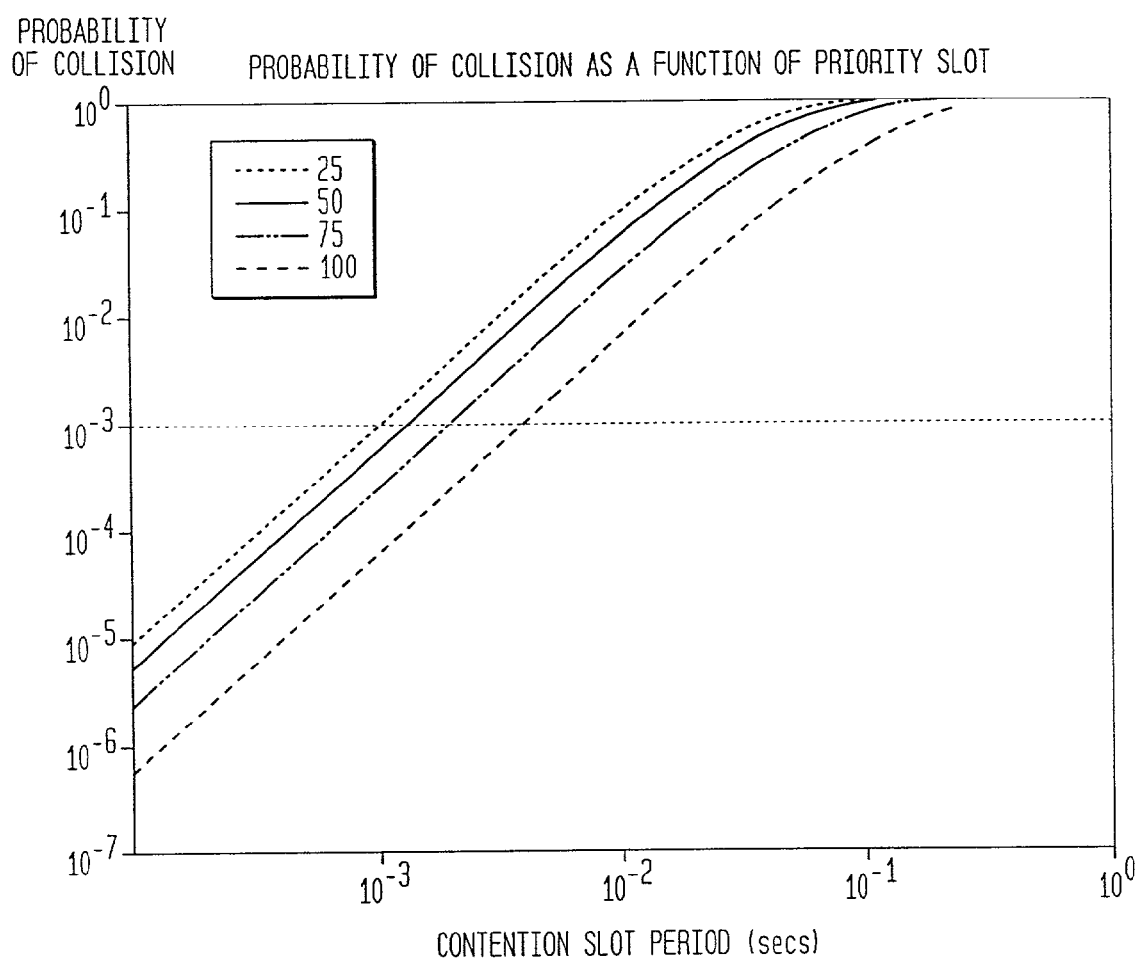
FIG. 8 illustrates the relationship between the periodicity of CMSs (T) and the probability of collision (Pc) for several numbers of silent users (N) according to an embodiment of the present invention.

Initial simulations have shown that with 1 voice priority contention slot per 100 upstream slots (1% overhead) the delay in activating the unsolicited grant service may be less than 5 ms. Based on these results, the present invention specifies that CMTS scheduler 110 should allocate one contention mini-slot for voice priority for every 200 mini-slots on the upstream. The relationship between the periodicity of CMSs (T) and the probability of collision (Pc) for several numbers of silent users (N) is shown in FIG. 8. Early indication for call reactivation in contention-based silence suppression is described next in Section H.

Figure 10:
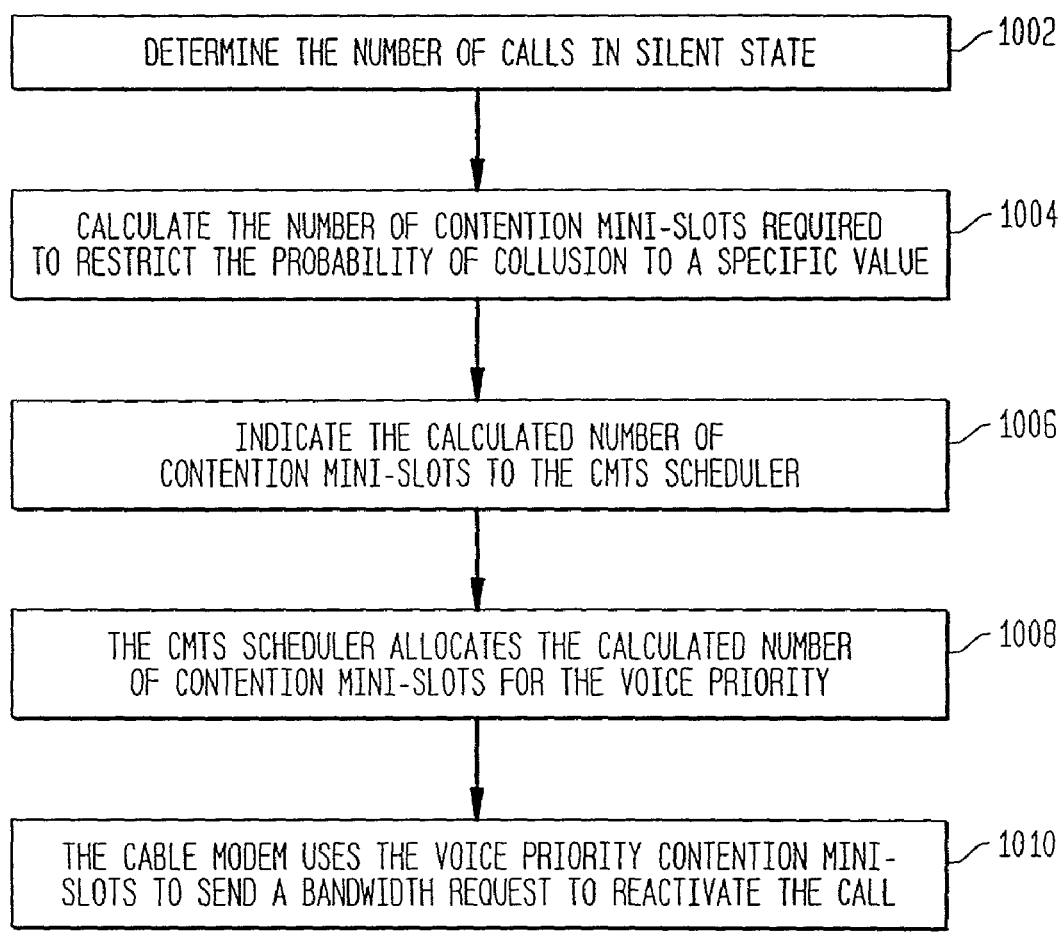
FIG. 10 is a flowchart that illustrates how the present invention determines the number of contention mini-slots needed for voice priority.

FIG. 10 is a flowchart that illustrates how the present invention determines the number of contention mini-slots needed for voice priority. FIG. 10 starts in step 1002. In step 1002, the number of calls in silent state is determined. Control then passes to step 1004.

In step 1004, the number of contention mini-slots required is calculated to restrict the probability of collusion to a specific value. Control then passes to step 1006.

In step 1006, indicate the calculated number of contention mini-slots to CMTS scheduler 110. Control then passes to step 1008.

In step 1008, CMTS scheduler 110 allocates the calculated number of contention mini-slots for the voice priority. Control then passes to step 1010.

In step 1010, cable modem 104 uses the voice priority contention mini-slots to send a bandwidth request to reactivate the call. The flowchart in FIG. 10 ends at this point.

H. Early Indication for Call Reactivation/Deactivation in Contention-Based Silence Suppression The packetization of voice helps the present invention to indicate to CMTS 102 (i.e., in the MAC layer) earlier, the need to reactivate the unsolicited grant service. This is due to the fact that the voice packet is generated once every packetization interval. The call is equally likely to become active anytime during that interval. If the present invention allows a voice activity detector to indicate to the MAC layer as soon as the call is active, then the MAC layer can start the process of reactivating the unsolicited grant service stream half a packetization interval earlier. This early indication helps to reduce the jitter in reactivating the voice call when it transitions from active to silent. The same indication helps for early indication for call deactivation by indicating the silence in the last packet.

I. Example Environment of the Present Invention

Figure 9:
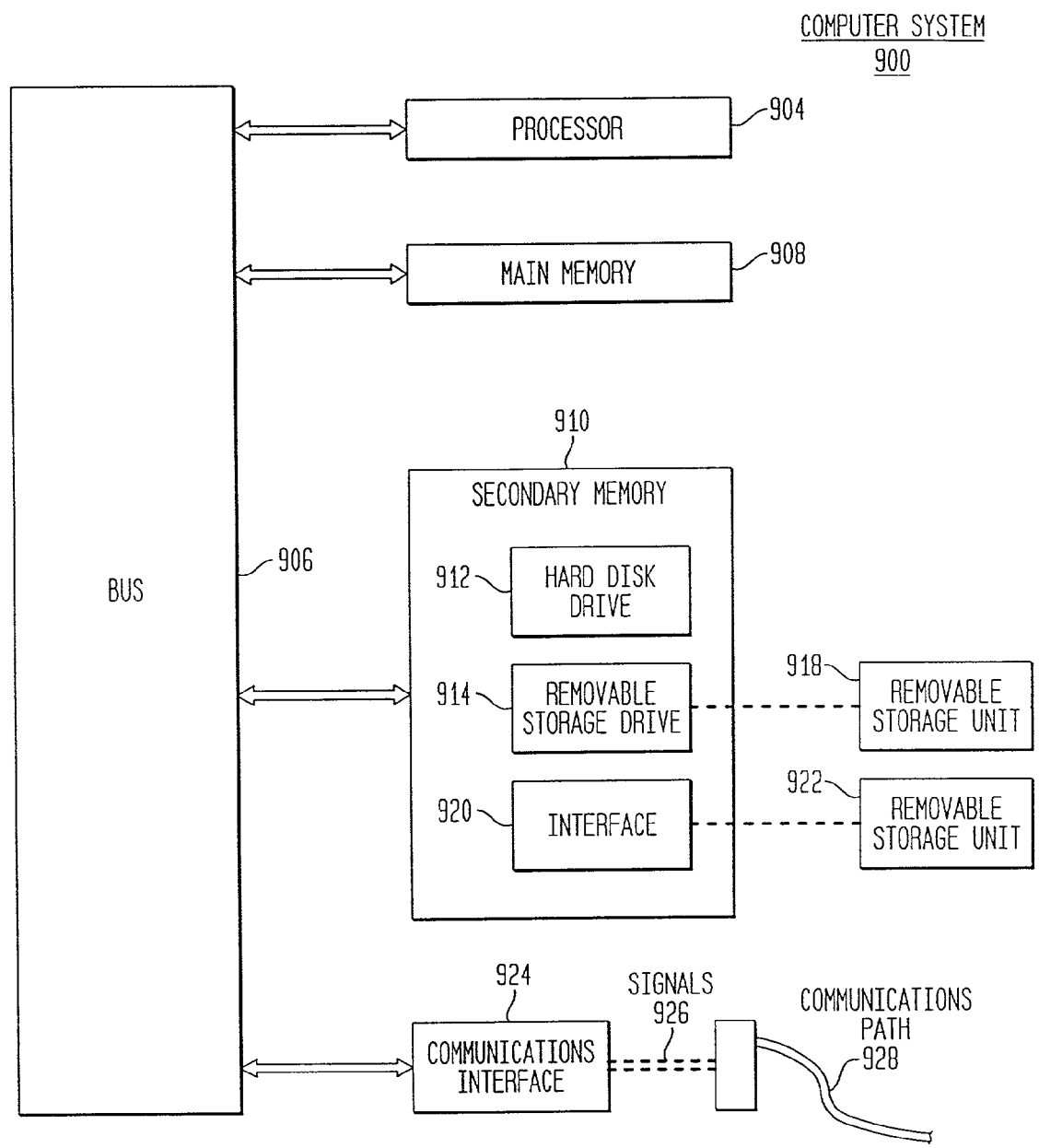
FIG. 9 illustrates an example computer used to implement the CMTS, the CMTS scheduler, the cable modem scheduler, the connection admission control and the contention resolution algorithm according to and embodiment of the present invention.

CMTS 102, CMTS scheduler 110, cable modem scheduler 116, connection admission control 112, codec 117 and contention resolution algorithm 111 may be implemented using computer 900 as shown in FIG. 9. Obviously, more than one of these functional components could be implemented on a single computer 900.

The present invention may be implemented using hardware, software or a combination thereof and may be implemented in a computer system or other processing system. In fact, in one embodiment, the invention is directed toward one or more computer systems capable of carrying out the functionality described herein. The computer system 900 includes one or more processors, such as processor 904. The processor 904 is connected to a communication bus 906. Various software embodiments are described in terms of this example computer system. After reading this description, it will become apparent to a person skilled in the relevant art how to implement the invention using other computer systems and/or computer architectures.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 900.

Computer system 900 can also include a communications interface 924. Communications interface 924 allows software and data to be transferred between computer system 900 and external devices. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 918, a hard disk installed in hard disk drive 912, and signals 926. These computer program products are means for providing software to computer system 900.

Computer programs (also called computer control logic) are stored in main memory and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

J. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for suppressing silence in bi-directional communications between a centralized node and a plurality of local nodes in an asynchronous network environment, comprising the steps of:
   detecting a silent period in an upstream channel, said upstream channel transmitting data from a local node; and
   deactivating unsolicited grant service and not activating request polling in response to said detecting a silent period.

2. The method of claim 1, further comprising the step of receiving an activity message from the local node to detect said silent period.

3. The method of claim 2, further comprising the step of receiving said activity message in a contention mini-slot.

4. The method of claim 2, wherein said activity message includes a silence flag marked to designate the start of said silent period.

5. The method of claim 1, further comprising the step of detecting said silent period in response to a number of unused grants exceeding a predetermined threshold.

6. The method of claim 1, further comprising the step of reducing downstream transmissions to the local node in response to said detecting a silent period.

7. The method of claim 1, further comprising the step of reactivating unsolicited grant service upon receipt of an activity message.

8. The method of claim 7, wherein said activity message is a bandwidth request.

9. The method of claim 7, further comprising the step of receiving said activity message in a contention mini-slot.

10. The method of claim 7, further comprising the step of receiving said activity message as a piggyback request in a grant.

11. The method of claim 1, further comprising the step of detecting said silent period in an upstream channel transmitting voice data.

12. The method of claim 1, further comprising the step of detecting said silent period in an upstream channel transmitting voice data over an internet protocol.

13. The method of claim 1, wherein said step of detecting a silent period, further comprises the step of receiving a signal from an activity detector indicating silence.

14. The method of claim 1, further comprising the step of reactivating unsolicited grant service upon receipt of a signal from an activity detector indicating activity.

15. A method for compressing silence in bi-directional communications between a centralized node and a plurality of local nodes in an asynchronous network environment, comprising the steps of:
   providing a first level of unsolicited grant service having a first bandwidth requirement;
   detecting a silent period in an upstream channel, said upstream channel transmitting data from a local node; and
   providing a second level of unsolicited grant service in response to said detecting a silent period, wherein said second level of unsolicited grant service has a second bandwidth requirement that is less than said first bandwidth requirement.

16. The method of claim 15, further comprising the step of receiving an activity message from the local node to detect said silent period.

17. The method of claim 16, wherein said activity message includes a silence flag marked to designate the start of a silent period.

18. The method of claim 15, further comprising the step of detecting said silent period in response to a reduction in grant usage.

19. The method of claim 15, further comprising the step of reactivating unsolicited grant service upon receipt of an activity message.

20. The method of claim 15, further comprising the step of detecting said silent period in an upstream channel transmitting voice data.

21. The method of claim 15, further comprising the step of detecting said silent period in an up stream channel transmitting voice data over an internet protocol.

22. The method of claim 15, wherein said step of detecting a silent period, further comprises the step of receiving a signal from an activity detector indicating silence.

23. The method of claim 15, further comprising the step of reactivating unsolicited grant service upon receipt of a signal from an activity detector indicating activity.

24. A method of determining the number of contention mini-slots required for voice priority in bi-directional communications between a centralized node and a plurality of local nodes in an asynchronous network environment, comprising the steps of:
   determining a number of calls in a silent state;
   calculating a number of contention mini-slots required to restrict a probability of collision to a specific value based on said number of calls in a silent state;
   indicating said calculated number of contention mini-slots to a cable modem termination system (CMTS) scheduler, wherein the CMTS scheduler allocates said calculated number of contention mini-slots for voice priority; and
   using the voice priority contention mini-slots to send a bandwidth request to reactivate the calls.

* * * * *

UNITED STATES PATENT AND TRADEMARK OFFICE
CERTIFICATE OF CORRECTION

PATENT NO. : 6,993,007 B2 Page 1 of 1
APPLICATION NO. : 09/783405
DATED : January 31, 2006
INVENTOR(S) : Ajay Chandra V. Gummalla et al.

It is certified that error appears in the above-identified patent and that said Letters Patent is hereby corrected as shown below:

In column 12, line 37, "up stream" should be replaced with --upstream--.

Signed and Sealed this

Twelfth Day of May, 2009

JOHN DOLL
*Acting Director of the United States Patent and Trademark Office*